UNITED STATES PATENT OFFICE.

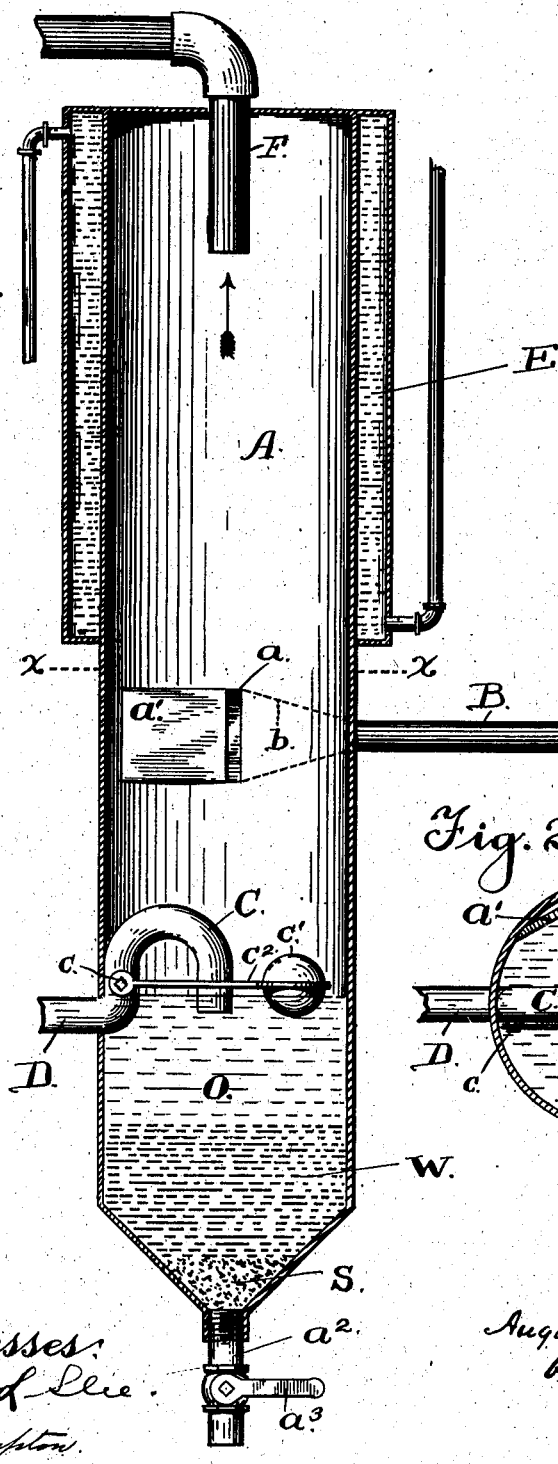

AUGUSTUS STEIGER COOPER, OF BERKELEY, CALIFORNIA.

SEPARATOR FOR GAS, OIL, WATER, AND SAND.

No. 815,407.  Specification of Letters Patent.  Patented March 20, 1906.

Application filed June 14, 1905. Serial No. 265,148.

*To all whom it may concern:*

Be it known that I, AUGUSTUS STEIGER COOPER, a citizen of the United States, residing at Berkeley, county of Alameda, State of California, have invented certain new and useful Improvements in Separators for Gas, Oil, Water, and Sand; and I hereby declare the following to be a full, clear, and exact description of the same.

My invention relates to that class of separators used in connection with gas and oil wells by which a separation is effected of the several constituents of the contents issuing from well-pipe. In that process which I set forth in a contemporaneous application for a patent a portion of the gas from the well is used repeatedly as a lift or pulverizer to relieve the well of oil and water by raising or assisting to raise them. The contents of the discharge-pipe, composed of gas, oil, water, sand, and silt, is forced into a vessel included in the pressure system, wherein the constituents are separated without affecting the general pressure in the system and the gas recovered and taken to the compressor to be used again in part as the lift or pulverizer to relieve the well, the surplus of the gas being conducted away for any useful purpose.

It is to such a separator that my invention relates, its object being to efficiently separate and deliver the gas, oil, water, and sand from a pressure system used in lifting or pulverizing the oil and water and relieving the well of them.

To this end my invention consists in the novel separator which I shall now describe by reference to the accompanying drawings, in which—

Figure 1 is a vertical section of the separator. Fig. 2 is a cross-section on the line $x\ x$ of Fig. 1.

A is a cylinder of suitable capacity. In one side is made an inlet-opening $a$, leading through the wall at an angle, whereby the discharge end $b$ of the pipe B from the well is adapted to deliver the pipe contents into the cylinder tangentially to its circumference. A steel wearing-plate $a'$ is fixed to the inner wall of the cylinder to receive the material. The lower end of the cylinder has an outlet $a^2$, with a controlling-cock $a^3$.

From the cylinder at a predetermined level above its bottom issues a pipe C, which connects with the pipe D, which leads to the oil-tank. The pipe C has a cock $c$, which is operated automatically by the float $c'$, connected with it by an arm $c^2$. Around the upper portion of the cylinder is a water-jacket E, and from the top of the cylinder leads the gas-pipe F to the compressor.

The operation is as follows: Gas, oil, water, silt, and sand are forced from near the bottom of the well by the compressed gas and pass through the pipe B into the cylinder A. Entering the cylinder under pressure tangentially to its circumference, the material is thereby given a rotary motion, which separates the constituents conformably to their specific gravities. The gas rises and passes from the cylinder through pipe F to the compressor. The sand seeks the outer circle and drops down to the bottom, as is indicated by S. The water W lies on the sand, while the oil O lies on the water. When these constituents accumulate to raise the oil to a certain level, the float $c'$ rises and opens the cock $c$, thereby permitting the oil to be forced out by the internal pressure in the system through the pipe C to the oil-tank. When enough oil has been forced out to lower the level, the cock $c$ is automatically closed by the descent of the float. When the cock $a^3$ is opened, the sand and water may be blown off through the outlet $a^2$. A high pressure of gas may thus be maintained in this cylinder. The water-jacket cools the gas before it is used in the compressor.

Having thus described the invention, what I claim as new, and desire to secure by Letters Patent, is—

1. A separator for gas, oil, water and sand, comprising a cylinder, a means for delivering the material into its side tangentially to its circumference, to impart a rotary motion to said material, whereby its constituents are separated, an exit for the gas at the top of the cylinder, an exit for the sand and water at the bottom of the cylinder, and an intervening exit for the oil automatically controllable by the level of said oil.

2. A separator for gas, oil, water and sand, comprising a vessel, means for imparting to the material fed to it a rotary motion to separate its constituents according to their specific gravities, an exit for the gas at the top of the cylinder, an exit for the sand and water at the bottom of the cylinder, and an intervening exit for the oil, automatically controllable by the level of said oil.

3. A separator for gas, oil, water and sand, comprising a vessel, means for imparting to the material fed to it a rotary motion to separate its constituents according to their specific gravities, an exit at the top for the gas, an exit at the bottom for the sand and water, an intervening exit for the oil, a cock controlling said last-named exit, and a float connected with the cock to open and close it according to the level of the oil.

4. A separator for gas, oil, water and sand, comprising a cylinder, a means for delivering the material into its side tangentially to its circumference, to impart a rotary motion to said material, whereby its constituents are separated, an exit for the gas at the top of the cylinder, an exit for the sand and water at the bottom of the cylinder, and an intervening exit for the oil, automatically controllable by the level of said oil, by means of a cock operated by a float in said liquid constituent.

In witness whereof I have hereunto set my hand.

AUGUSTUS STEIGER COOPER.

Witnesses:
J. COMPTON,
D. B. RICHARDS.